United States Patent
Fergusson et al.

(10) Patent No.: US 9,804,712 B2
(45) Date of Patent: Oct. 31, 2017

(54) CONTACT-FREE INTERACTION WITH AN ELECTRONIC DEVICE

(71) Applicant: BlackBerry Limited, Waterloo (CA)

(72) Inventors: Andrew Ashraf Fergusson, St. Clements (CA); Iouri Petrovitch Besperstov, Innisfil (CA); Jacek Idzik, Kenilworth (CA)

(73) Assignee: BlackBerry Limited, Waterloo (CA)

( * ) Notice: Subject to any disclaimer, the term of this patent is extended or adjusted under 35 U.S.C. 154(b) by 754 days.

(21) Appl. No.: 13/974,429

(22) Filed: Aug. 23, 2013

(65) Prior Publication Data

US 2015/0054774 A1 Feb. 26, 2015

(51) Int. Cl.
| | |
|---|---|
| G06F 3/044 | (2006.01) |
| G01B 7/14 | (2006.01) |
| G06F 3/01 | (2006.01) |
| G06F 3/03 | (2006.01) |
| G06F 3/046 | (2006.01) |

(52) U.S. Cl.
CPC ............... *G06F 3/044* (2013.01); *G01B 7/14* (2013.01); *G06F 3/017* (2013.01); *G06F 3/03* (2013.01); *G06F 3/046* (2013.01); *G06F 2203/04101* (2013.01)

(58) Field of Classification Search
CPC ....................................................... G06F 3/046
See application file for complete search history.

(56) References Cited

U.S. PATENT DOCUMENTS

| | | |
|---|---|---|
| 1,661,058 A | 2/1928 | Ssergejewitsch |
| 5,990,865 A | 11/1999 | Gard |

(Continued)

FOREIGN PATENT DOCUMENTS

DE 102007014790 10/2008

OTHER PUBLICATIONS

Brian Dodson, "Breakthrough 3D gesture controller opens new vistas for human-computer interfacing", Gizmag.com, Nov. 20, 2012; http://www.gizmag.com/electric-field-3d-motion-gesture-recognition-chip-microchip/25072/.

Ackerley Tng and Lydia Wang, "Ultrasound Gesture Detection", ECE 4760 Final Project, Cornell University, 2012; http://people.ece.cornell.edu/land/courses/ece4760/FinalProjects/f2012/alt53_lw354/alt53_lw354/index.htm.

(Continued)

*Primary Examiner* — Jennifer Mehmood
*Assistant Examiner* — Carl Adams
(74) *Attorney, Agent, or Firm* — Ridout and Maybee LLP

(57) ABSTRACT

The present disclosure provides an electronic device configured to detect an object positioned at a distance. The electronic device includes a reference oscillator generating a reference signal having a reference frequency; and a first measurement oscillator coupled to a first antenna located at a first position of the electronic device. The first measurement oscillator generates a first measurement signal having a first measurement frequency corresponding to a distance of an object from the first antenna. The first antenna has a first antenna load corresponding to the distance of the object from the first antenna, and the first measurement frequency varies in dependence on the first antenna load. The electronic device also includes a comparator coupled to the reference oscillator and the first measurement oscillator which generates a comparator output including a difference between the reference frequency and the first measurement frequency which represents the distance of the object from the first antenna.

22 Claims, 7 Drawing Sheets

(56) References Cited

U.S. PATENT DOCUMENTS

| | | | |
|---|---|---|---|
| 6,130,663 | A | 10/2000 | Null |
| 8,354,997 | B2 | 1/2013 | Boillot |
| 8,398,488 | B2 | 3/2013 | Wells |
| 2002/0036622 | A1* | 3/2002 | Jaeger ................. G06F 3/03545 345/173 |
| 2002/0183032 | A1* | 12/2002 | Fang ..................... G06F 1/1616 455/280 |
| 2005/0156641 | A1* | 7/2005 | Dimmler .............. H03K 3/0315 327/156 |
| 2006/0161870 | A1 | 7/2006 | Hotelling et al. |
| 2010/0156676 | A1 | 6/2010 | Mooring |
| 2010/0223582 | A1 | 9/2010 | Dods |
| 2011/0090146 | A1* | 4/2011 | Katsurahira ........ G06F 3/03545 345/156 |
| 2011/0090147 | A1 | 4/2011 | Gervais |
| 2012/0188200 | A1* | 7/2012 | Roziere .................. G06F 3/044 345/174 |
| 2012/0225719 | A1 | 9/2012 | Nowozin et al. |
| 2012/0244909 | A1 | 9/2012 | Coggill |
| 2012/0313900 | A1 | 12/2012 | Dahl |
| 2012/0326961 | A1 | 12/2012 | Bromer |
| 2013/0196716 | A1* | 8/2013 | Muhammad ............ G06F 3/046 455/566 |
| 2013/0211843 | A1 | 8/2013 | Clarkson |

OTHER PUBLICATIONS

Website, Touchless Interactive Screen—Presentation Transcript, 2001, http://www.slideshare.net/Gautam.M/touchless-interactive-screen.

Website, "Colpitts oscillator", Wikipedia, at least as early as Aug. 2013; http://en.wikipedia.org/wiki/Colpitts_oscillator.

Parvin Asadzadeh, Lars Kulik, and Egemen Tanin, "Real-time Gesture Recognition Using RFID Technology", Proceedings of 5th International Workshop on Pervasive Advertising, pervasiveadvertising.org, 2012, http://pervasiveadvertising.org/wp-content/uploads/2011/12/perad5-asadzadeh.pdf.

Steve Hobley, "A Touchless 3D Tracking Interface", Make, at least as early as Aug. 2013; http://blog.makezine.com/projects/a-touchless-3d-tracking-interface/.

Paulo Lopez-Meyer, Yogendra Patil, Tiffany Tiffany, and Edward Sazonov, "Detection of Hand-to-Mouth Gestures Using a RF Operated Proximity Sensor for Monitoring Cigarette Smoking", Open Biomed Eng J. 2013; 9: 41-49, Apr. 5, 2013; http://benthamscience.com/open/tobej/articles/V007/41TOBEJ.pdf.

Huang et al.: "Oscillator-based touch sensor for mobile applications", Jan 1, 2012; XP055289660.

Extended European Search Report; EP14837535.5; Jul. 27, 2016.

* cited by examiner

CONTACT-FREE INTERACTION WITH AN ELECTRONIC DEVICE

TECHNICAL FIELD

The present disclosure relates to an electronic device configured to detect contact-free interaction with the electronic device.

BACKGROUND

Human-computer interaction is enhanced when the methods of detecting user input feel natural to the user. This has prompted an increase in computing devices having a touch-sensitive display for receiving user inputs. In some cases the touch-sensitive display acts as the primary human-computer interaction interface. However, existing human-computer interaction interfaces have drawbacks and are in need of improvement. Thus, there remains a need for new methods and devices for human-computer interaction.

BRIEF DESCRIPTION OF THE DRAWINGS

Reference will now be made, by way of example, to the accompanying drawings which show example embodiments of the present application, and in which.

Similar reference numerals have been used in different figures to denote similar components.

DESCRIPTION OF EXAMPLE EMBODIMENTS

Figure 1:
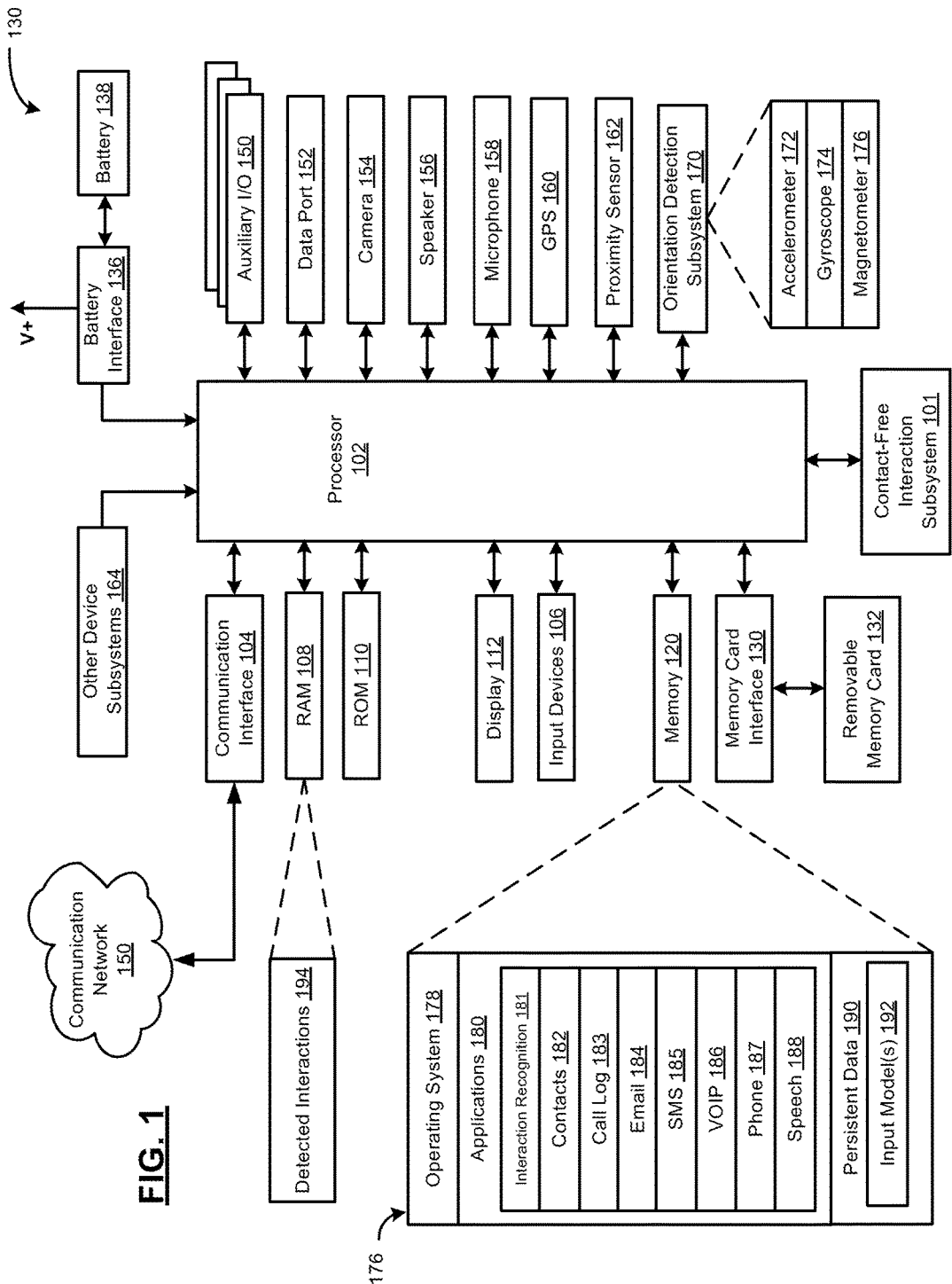
FIG. 1 illustrates in block-diagram form an example electronic device suitable for detecting an object in accordance with the teachings of the present disclosure.

Reference will now be made to the accompanying drawings which show example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practiced without some of these details. In other instances, well-known methods, procedures, and components have not been described in detail to avoid obscuring the example embodiments described. The description is not to be considered as limited to the scope of the example embodiments described herein.

Any reference to direction or orientation stated herein is for convenience and is not intended to be limiting unless explicitly stated herein. Any directional references in relation to the graphical user interface (GUI) are relative to the screen orientation of the GUI rather than a fixed point or reference on the host electronic device. The term "user interface" is sometimes used herein to refer to the GUI for convenience. For the purpose of the present disclosure, the terms device orientation and device position are treated equivalently.

The present disclosure discloses an input device for contact-free user interaction which provides a human-computer interaction interface which feels natural to a user. For example, turning a page of a paper book usually involves flicking a finger from right to left at the bottom of the page. To provide similar functionality in the context of an electronic book or "e-book", it may be advantageous to allow a similar human-computer interaction without requiring the user to touch the electronic device, for example, to allow a greater range of space in which the user can perform an associated motion gesture and/or to avoid leaving fingerprints on the display of the electronic device. Thus, an electronic device configured to detect contact-free interaction with the electronic device may therefore be advantageous.

An electronic device in accordance with the present disclosure includes a contact-free user interaction subsystem which detects interactions performed near the electronic device. The maximum distance from the electronic device within which the interactions must be performed depends on the sensitivity of the contact-free user interaction subsystem which will vary between embodiments. It is contemplated that the interactions may be performed along one or more sides of the display (e.g., touch-sensitive display) of the host electronic device, or along one or more sides of the keyboard of the host electronic device. For example, to turn the page of an e-book to the next page, the user may move a finger from left to right at the bottom of the page of e-book displayed on the display, and to turn the page of an e-book to the previous page, the user may move a finger from right to left at the bottom of the page of e-book displayed on the display. The electronic device detects the interaction using a contact-free user interaction subsystem. The detected interaction is then compared by the processor with a previously stored input model to determine if a match between the detected interaction and the stored input model exists. When a match is determined to exist, an action associated with the input model may then be performed, for example the action may be to navigate to the next page.

A continuous stream of input data from the contact-free user interaction subsystem can be provided to the processor of the host electronic device. The continuous stream of input data can be analyzed in real-time or near real-time by the processor so that, if at any moment the processor determines that the detected interaction (e.g., motion gesture) matches a predetermined interaction (e.g., motion gesture), an associated action may be performed by the processor.

In accordance with one embodiment of a first aspect of the present disclosure, there is provided an electronic device, comprising: a reference oscillator generating a reference signal having a reference frequency; a first measurement oscillator coupled to a first antenna located at a first position of the electronic device, wherein the first measurement oscillator generates a first measurement signal having a first measurement frequency corresponding to a distance of an object from the first antenna; and a comparator coupled to the reference oscillator and the first measurement oscillator which generates a comparator output including a difference between the reference frequency and the first measurement frequency which represents the distance of the object from the first antenna. In second embodiment, the first antenna has a first antenna load corresponding to the distance of the object from the first antenna, and wherein the first measurement frequency varies in dependence on the first antenna load.

In accordance with one embodiment of a second aspect of the present disclosure, there is provided a method for detecting an object positioned at a distance from an electronic device, comprising: generating a reference signal having a reference frequency; generating a first measurement signal having a first measurement frequency corresponding to a distance of the object from a first antenna located at a first position of the electronic device; and determining a difference between the reference frequency and the first measurement frequency which represents the distance of the object from the first antenna.

In accordance with one embodiment of the present disclosure, the reference frequency and the first measurement frequency are substantially the same in the absence of the object within a sensitivity region of the first antenna.

In accordance with one embodiment of the present disclosure, the reference frequency is any frequency within any one of the industrial, scientific or medical (ISM) radio bands.

In accordance with one embodiment of the present disclosure, the method further includes outputting a difference signal having a difference frequency representing the difference between the reference frequency and the first measurement frequency.

In accordance with one embodiment of the present disclosure, the method further includes converting the difference signal to a square-wave signal to determine the difference frequency.

In accordance with one embodiment of the present disclosure, the method further includes converting the difference signal to the square-wave signal; and counting pulses of the square-wave signal during a predetermined time interval to determine the difference frequency.

In accordance with one embodiment of the present disclosure, the method further includes generating a second measurement signal having a second measurement frequency corresponding to a distance of the object from a second antenna located at a second position of the electronic device; generating a third measurement signal having a third measurement frequency corresponding to a distance of the object from a third antenna located at a third position of the electronic device; wherein the first, second and third antennas are positioned within a common plane and spaced apart from each other; determining a difference between the reference frequency and the second measurement frequency which represents the distance of the object from the second antenna; and determining a difference between the reference frequency and the third measurement frequency which represents the distance of the object from the third antenna.

In accordance with one embodiment of the present disclosure, the method further includes determining from the first, second and third comparator outputs a relative location of the object based on a distance of the object to each of the first, second and third antenna.

In accordance with one embodiment of the present disclosure, the method further includes determining whether the location of the object moves over time; and when the location of the object moves over time, determining whether movement of the object matches an input model for a motion gesture to detect the motion gesture; and performing an action associated with the detected motion gesture.

In accordance with one embodiment of the present disclosure, the action is dependent on a context in which the detected motion gesture was performed.

In accordance with one embodiment of another aspect of the present disclosure, there is provided an electronic device, comprising: a first measurement oscillator coupled to a first antenna located at a first position of the electronic device, wherein the first measurement oscillator is tuned to generate a reference signal having a reference frequency in the absence of an object within a sensitivity region of the first antenna, and wherein the first measurement oscillator is tuned to generate a first mc\Dsurcmcnt signal having a first measurement frequency corresponding to a first antenna load of the first antenna; and a filter coupled to the first measurement oscillator which generates an output signal representing a difference between the reference frequency and the first measurement frequency which represents a distance of an object from the first antenna.

In accordance with one embodiment of a further aspect of the present disclosure, there is provided a non-transitory computer readable medium having stored thereon computer program instructions for performing the methods described herein.

Reference is first made to FIG. 1 which illustrates in block-diagram form an example electronic device 130 suitable for detecting an object. Examples of the electronic device 130 include, but are not limited to, a mobile phone, smartphone or superphone, tablet computer, notebook computer (also known as a laptop, netbook or ultrabook computer depending on the device capabilities), wireless organizer, personal digital assistant (PDA), electronic gaming device, and special purpose digital camera. In some embodiments, the electronic device 130 is an accessory device, receiving instructions from a second computing device (not shown). Examples of an accessory (peripheral) device may include, without limitation, a keyboard and touchpad (or trackpad), which is connected to the electronic device 130 using a wired (e.g., USB, Firewire) or wireless (e.g., Bluetooth) connection. In the shown embodiment, the electronic device 130 is a mobile communication device.

The electronic device 130 includes a rigid case (not shown) housing the electronic components of the electronic device 130. The electronic components of the electronic device 130 are mounted on a printed circuit board (not shown). The electronic device 130 includes a processor 102 which controls the overall operation of the electronic device 130. Communication functions, including data and voice communication, are performed through a communication interface 104. The communication interface 104 receives messages from and sends messages via the communication network 150. The communication interface 104 typically includes a Wireless Wide Area Network (WWAN) interface for communication over cellular networks and a Wireless Local Area Network (WLAN) interface for communication over Wi-Fi networks.

The processor 102 interacts with other components such as, without limitation, a contact-free interaction subsystem 101 in accordance with the present disclosure, one or more input devices 106, RAM 108, ROM 110, a display 112, persistent (non-volatile) memory 120 which may be flash memory or any other suitable form of memory, auxiliary I/O subsystems 150, data port 152 such as serial data port (e.g., Universal Serial Bus (USB) data port), camera 154 such as video and/or still camera, speaker 156, microphone 158, a global positioning system (GPS) device 160 which enables the processor 102 to determine GPS coordinates (i.e., location) of the electronic device 130 at any appropriate time, proximity sensor 162 which enables the processor 102 to determine the distance between the electronic device 130 and an object at any appropriate time, an orientation detection subsystem 170 which enables the processor 102 to detect the orientation of the electronic device 130 at any appropriate time, and other device subsystems generally designated as 164. The components of the electronic device 130 are coupled via a communications bus (not shown) which provides a communication path between the various components.

The display 112 may be provided as part of a touchscreen which provides an input device 106. The display 112 which together with a touch-sensitive overlay (not shown) operably coupled to an electronic controller (not shown) comprise the touchscreen. User-interaction with the GUI is performed through the input devices 106. Information, such as text, characters, symbols, images, icons, and other items are rendered and displayed on the display 112 via the processor 102. The processor 102 may interact with the orientation detection subsystem 170 to determine the orientation of the electronic device 130, for example, to determine a screen orientation for the GUI.

The input devices 106 may include a keyboard, control buttons (not shown) such as a power toggle (on/off) button, volume buttons, camera buttons, general purpose or context specific buttons, 'back' or 'home' buttons, phone function buttons, and/or a navigation device. When the display 112 is provided as part of a touchscreen, the various buttons or controls may be provided by onscreen user interface elements displayed on the display 112 instead of, or in addition to, physical interface components. The keyboard may be provided instead of, or in addition to, a touchscreen depending on the embodiment. At least some of the control buttons may be multi-purpose buttons rather than special purpose or dedicated buttons.

The electronic device 130 may also include a memory card interface 130 for receiving a removable memory card 132 comprising persistent memory, such as flash memory. A removable memory card 132 can be inserted in or coupled to the memory card interface 130 for storing and reading data by the processor 102 including, but not limited to still images and optionally video images captured the camera 154. Other types of user data may also be stored on the removable memory card 132. Other types of removable digital image storage media, such as magnetic hard drives, magnetic tape, or optical disks, may be used in addition to, or instead of, the removable memory card 132.

The processor 102 operates under stored program control and executes software modules 176 stored in memory, for example, in the persistent memory 120. As illustrated in FIG. 1, the software modules 176 also comprise operating system software 178 and software applications 180. The software applications 180 may include a contact-free interaction recognition application 181 and, without limitation, one or more of a contacts application 182, a call log application 183, an email application 184, a Short Messaging Service (SMS) application 185, a Voice over Internet Protocol (VoIP) application 186, a phone application 187, a voice recognition or "speech" application 188 and possibly other applications. The software modules 176 or parts thereof may be temporarily loaded into volatile memory such as the RAM 108. The RAM 108 is used for storing runtime data variables and other types of data or information, such as input data generated in real-time by the contact-free interaction subsystem 101 stored as detected contact-free interactions 194. The detected interactions 194 include multiple values representative of a distance between the object and one or more sensors over a period of time. Although specific functions are described for various types of memory, this is merely one example, and a different assignment of functions to types of memory could also be used.

The persistent memory 120 also stores data 190 such as one or more input models 192 which is used to interpret detected interactions 194 detected by the contact-free interaction subsystem 101 over time by determining whether a detected interaction 194 represents a movement of an object which matches a predefined motion gesture defined by the one or more input models 192. When the movement matches, a motion gesture is detected. The contact-free interactions 194 may be detected in real-time or near real-time by the contact-free interaction subsystem 101 and stored in RAM 108 as detected interactions 194, for example, in an array. It will be appreciated that each predefined motion gesture may be defined by a separate input model 192 or a single input model 192 may define several predefined motion gestures depending on the implementation of the input models 192, described more fully below. Within the present disclosure, the term motion gesture is understood to mean a contact-free gesture performed with a user's hand, finger or other object such as a stylus, and is distinct from a touch gesture detected by a touch-sensitive display or touchscreen.

Each input model 192 may include parameters related to a motion gesture. The parameters may include, without limitation, any one of a displacement of an object, a direction of motion of the object along each of an x, y and z axis, speed of motion of the object, and the acceleration of the object. The detected contact-free interactions 194 may in some embodiments be analyzed to identify detected values for each parameter. The difference between the detected values and the values of each parameter in a particular input model 192 must be below a threshold value for the detected contact-free interactions 194 to be considered to match the particular input model 192. Additionally, a weighting factor may also be assigned to each parameter. The weighting factor provides an indication of the importance of each parameter for identifying the motion gesture associated with the input model 192; thus, may allow more or less tolerance for one or more of the parameters.

The communication interface 104 may include a short-range wireless communication subsystem (not shown) which provides a short-range wireless communication interface. The short-range wireless communication interface is typically Bluetooth® interface but may be another type of short-range wireless communication interface including, but not limited to, an IR interface such as an IrDA interface, an IEEE 802.15.3a interface (also referred to as UWB), Z-Wave interface, ZigBee interface or other suitable short-range wireless communication interface.

A received signal, such as a text message, an e-mail message, or web page download, is processed by the communication subsystem 104 and input to the processor 102. The processor 102 processes the received signal for output to the display 112 and/or to the auxiliary I/O subsystem 150. A subscriber may generate data items, for example e-mail messages, which may be transmitted over the communication network 150 through the communication subsystem 104, for example.

The electronic device 130 also includes a battery 138 as a power source, which is typically one or more rechargeable batteries that may be charged, for example, through charging circuitry coupled to a battery interface such as the serial data port 152. The battery 138 provides electrical power to at least some of the electrical circuitry in the electronic device 130, and the battery interface 136 provides a mechanical and electrical connection for the battery 138. The battery interface 136 is coupled to a regulator (not shown) which provides power V+ to the circuitry of the electronic device 130.

The orientation detection subsystem 170 comprises at least one sensor coupled to the processor 102 which is controlled by one or a combination of a monitoring circuit and operating software. In some embodiments, the orientation detection subsystem 170 enables to processor 102 to determine if the electronic device 130 the orientation of the electronic device 130 and/or the motion and the nature of any sensed motion at any appropriate time. The orientation detection subsystem 170 may comprise one or more sensors including any of accelerometer 172 (such as a three-axis accelerometer), gyroscope 174, magnetometer 176, or other suitable sensor, or combinations thereof. In some embodiments, the orientation detection subsystem 170 may comprise one or more imaging sensors, including but not limited to imaging sensors suited to detect infrared light. The orientation detection subsystem 170, or parts thereof, may be combined or shared, for example, within an integrated component.

The contact-free interaction subsystem 101 enables the electronic device 130 to detect contact-free user interaction (e.g., gestures) by detecting a change in the electric load of a sensor of the contact-free interaction subsystem 101 due to the presence of an object close to the subsystem 101, and using the detected change to determine a distance of the object from the electronic device 130. The object causing the change in the electric load may be, without limitation, any one of a user's hand, finger or stylus. As will be explained in more detail below, the sensor can be, for example, an antenna having an antenna load corresponding to the distance of the object from the antenna. When three or more sensors are used, the processor 102 of the electronic device 130 can determine a location or position of the object. When the object is a user's hand, an effective centroid of the user's hand can be determined in three-dimensional space. The processor 102 of the electronic device 130 can also use changes in the location or position of the object over time, changes in velocity position of the object over time and/or changes in the acceleration position of the object over time to identify movements of the object. A movement of the object, e.g. the user's hand, is detected or interpreted as a motion gesture when the movement matches a predefined motion gesture defined by one or more input models 192. The detection of motion gestures allows the user to interact with the electronic device 130. When the motion gestures are associated with an action of the active application or other context at the time when the gestures were performed, the associated action is performed by the processor 102. The term action is used herein to refer to any executable instruction which may be executed by an application 180 or the operating system 178.

The velocity and acceleration of the object, e.g. user's hand, can be used in additional to position to identify and detect motion gestures performed by the user.

Figure 2:
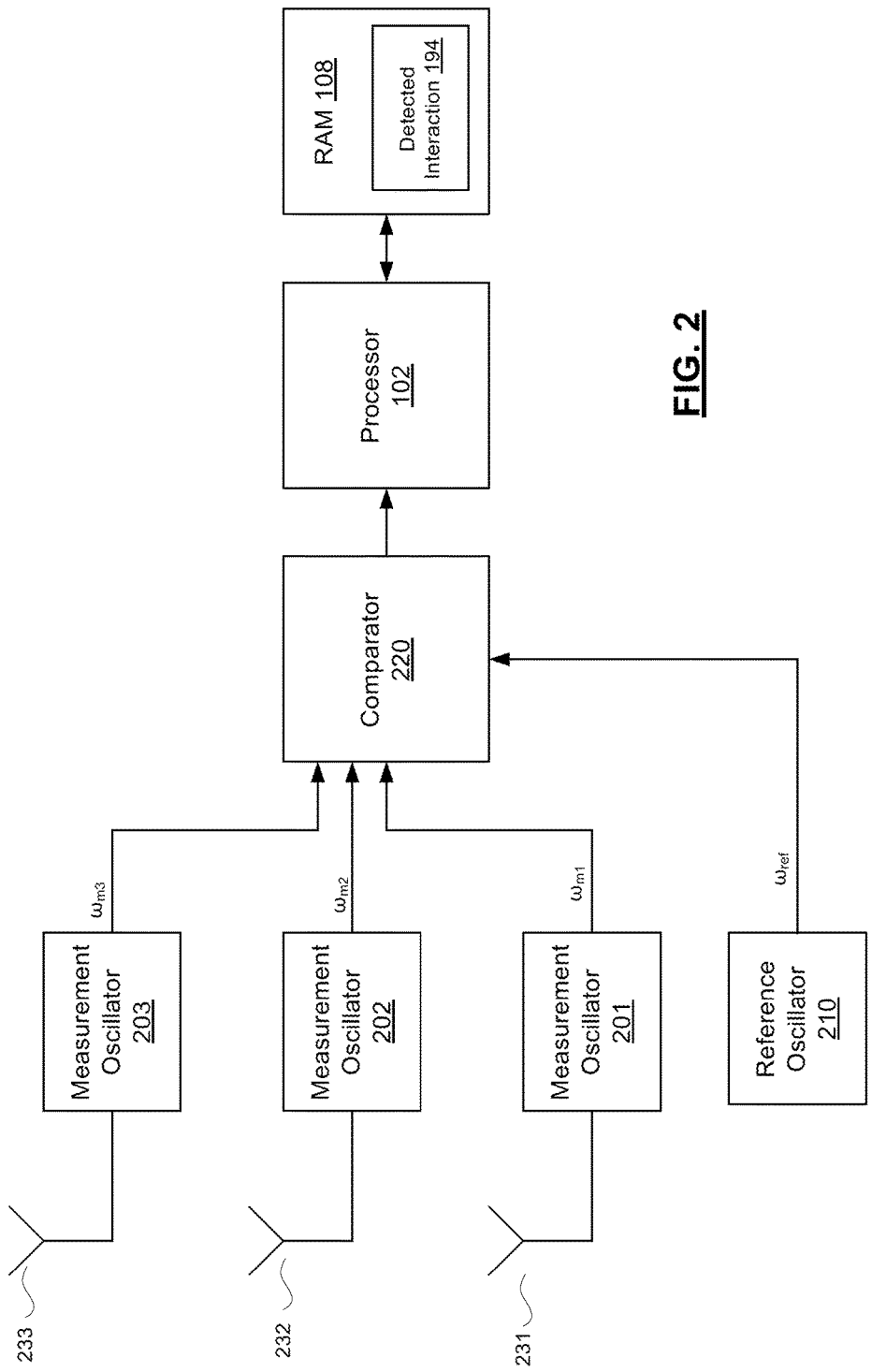
FIG. 2 illustrates in block-diagram form an example contact-free interaction subsystem for use with the electronic device of FIG. 1.

Reference is now made to FIG. 2, showing a block-diagram of an example contact-free interaction subsystem 101 coupled to the processor 102. The contact-free interaction subsystem 101 of FIG. 2 has a reference oscillator 210 and three measurement oscillators: first measurement oscillator 201, second measurement oscillator 202 and third measurement oscillator 203. The oscillators 210, 201, 202 and 203 are each configured to generate a signal having substantially the same frequency in the absence of an object within a sensitivity region of the respective antennas. In one example embodiment, the frequency of the oscillators may vary from one another by 0.2 to 2 MHz; however, other ranges are possible.

In some embodiments, the oscillators 210, 201, 202 and 203 are each configured to generate a signal having a frequency in any one of the industrial, scientific or medical (ISM) radio bands in which unlicensed operation is typically permitted. As an example, unlicensed transmissions within the 2.400 GHz to 2.4835 GHz band, a common ISM band, is generally permitted. However, in some jurisdictions, the power of signals in the ISM radio bands is restricted to help reduce unwanted interference between devices. Additionally, it is understood that the ISM bands may change over time and may vary between geographical regions. In preferred embodiments, each of the oscillators 210, 201, 202 and 203 generates a signal in any ISM radio band having a frequency greater than or equal to 1.5 GHz as this allows for efficiency in the electronics circuitry and antennas associated therewith. It will be appreciated that the wavelength of the RF signal produced decreases as the frequency of the RF signal is increased. At a 1.5 GHz oscillation frequency, the wavelength of the RF signal produced is approximately 20 cm. It is has been determined that beyond 20 cm (i.e., at frequencies below 1.5 GHz), unless range measurements are also taken into account and additional calculations are performed, ambiguity in the detection of the object and identification of gestures tends to increase because the antenna is less sensitive to small changes. A reference frequency of 1.5 GHz or more allows a relatively wide range of gesture detection applications since this frequency provides sensitivity to detect a user's hand or finger and movement in the user's hand or finger which are capable of detecting a wide range of motion gestures without detecting spurious movements. Additionally, a smaller antenna is generally required when a higher frequency is used; thus antenna location and shape are more flexible, and can be adapted to the form factor of the target device.

Each of the three measurement oscillators 201, 202 and 203 is coupled to an antenna 231, 232 and 233 located at a first position, second position and third position of the electronic device 130, respectively. Each antenna has an antenna load, due to the elements of the antenna. The antenna load may however vary when an object is within a sensitivity region of the antenna, thereby causing a detuning of the antenna.

The reference oscillator 210 generates a reference signal having a reference frequency ($\omega_{ref}$). The three measurement oscillators 201, 202, 203 each generate a measurement signal having a measurement frequency. The first measurement oscillator 201 generates a first measurement signal having a first measurement frequency ($\omega_{m1}$) corresponding to a distance of the object from the first antenna. The second measurement oscillator 202 generates a second measurement signal having a second measurement frequency ($\omega_{m2}$) corresponding to a distance of the object from the second antenna. The third measurement oscillator 203 generates a third measurement signal having a third measurement frequency ($\omega_{m3}$) corresponding to a distance of the object from the third antenna.

It will be appreciated that each antenna has an antenna load having a reactance value due to the inductive and capacitive elements (i.e., reactance) of the antenna. The object, when in the sensitivity region of the antenna, may increase or decrease the reactance depending on the characteristics of the antenna and the object. The reactance of the object depends on the permittivity of the object, which is dependent on the materials of the object. When the permittivity of the object is different from the permittivity of air, the object will cause the antenna load to vary and the antenna to be detuned. Accordingly, different objects will cause the antenna load to vary by a different amount when positioned at the same location relative to the antenna. For example, the relative permittivity of a plastic object may be approximately 2-3 times the permittivity of air, whereas the permittivity of water (a human hand is mainly comprised of water) is approximately 80 times the permittivity of air. Additionally, the detuning of the antenna has an effect on the signal generated by the coupled measurement oscillator; thus causing the measurement frequency of the coupled measurement oscillator to deviate from the reference frequency in accordance with the antenna load, in dependence on both the object and the distance of the object from the antenna.

In one example, an object having a permittivity different from air is located within the sensitivity region of the first antenna 231 coupled to the first measurement oscillator 201, but outside of the sensitivity region of second and third antennas 232, 233. The first measurement frequency ($\omega_{m1}$) is thus shifted from the reference frequency ($\omega_{ref}$). The difference between the reference frequency ($\omega_{ref}$) and the first measurement frequency ($\omega_{m1}$) represents the distance of the object from the first antenna 231. However, the second and third measurement frequencies ($\omega_{m2,3}$) remain substantially the same as the reference frequency ($\omega_{ref}$). For example, the first measurement frequency ($\omega_{m1}$) may change due to the presence of a conductive body such as a hand or finger within the sensitivity region of the first antenna 231.

Each of the reference signal and the three measurement signals is received by a comparator 202 coupled to the reference oscillator 210 and the measurement oscillators 201, 202 and 203. The comparator 202 determines the difference between each of the measurement frequencies ($\omega_{m1,2,3}$) and the reference frequency ($\omega_{ref}$). When any one of the measurement frequencies ($\omega_{m1,2,3}$) is shifted from the reference frequency ($\omega_{ref}$), it is determined that an object having a permittivity different from air is within the sensitivity region of the associated antenna. The comparator 202 may thus output, for processing by the processor 102, in real-time or near real-time, a comparator output comprising three values, each value representing the difference of each of the measurement frequencies ($\omega_{m1,2,3}$) from the reference frequency ($\omega_{ref}$). Each measurement frequency ($\omega_{m1,2,3}$) deviates from the reference frequency ($\omega_{ref}$) by a larger value when the object is moved closer to the associated antenna. The comparator output is therefore representative of the distance of the object from each of the antennas 231, 232 and 233.

Because different objects have a different permittivity values, the comparator output is not representative of an absolute distance. For example, an object having a transmit antenna and transmitting an electromagnetic signal may cause one or more of the antennas 231, 232 and 233 to be significantly detuned, thereby causing the measurement frequencies to deviate by a relatively large value. On the other hand, a finger positioned at the same position as the transmit antenna may cause one or more of the antennas 231, 232 and 233 to be insignificantly detuned, thereby causing the measurement frequencies to deviate by a relatively small value. The processor 102 is thus able to determine the presence of the object and the changes in the position of the object; however, it may not be necessary that the absolute position of the object be known.

The contact-free interaction subsystem 101 may be optionally calibrated for a particular object or type of object, such as a hand of a user or a stylus, thereby allowing the processor 102 to determine the absolute distance between the object and each of the antennas 231, 232 and 233. The calibration data is stored in a look-up table (LUT) in RAM 108 or persistent memory 120. The calibration data is specific to only one particular object or type of object, as each object and/or object type is expected to detune the antenna differently. A calibration procedure is executed by the processor 102, either during a device configuration stage at the factory (for a stylus) or by the user (for a hand). The calibration procedure may provide instructions on the display 112 instructing a user to position the object at various distances from each antenna. A typical calibration procedure requires the object to be positioned at least two distances from each antenna—a near-by distance and a far-away distance. The comparator output for each distance is then stored in the LUT. The processor 102 is thus able to determine the distance between an object and each antenna by extrapolating between the stored comparator output values.

The processor 102 may maintain in RAM 108 the comparator output generated over a predetermined period of time, for example, in the form of an array of values. The array is stored in RAM 108 as the detected interactions 194. The contact-free interaction recognition application 181 can be used to compare the detected interactions 194 with the one or more input models 192 to determine if the detected interactions 194 match any of the stored input models 192. Each input model represents a distinct, predefined motion gesture which represents movement of an object over time. The input models 192 may be defined in a LUT or by a series of algorithms defining various gestures, among other suitable means. The motion gestures may be two dimensional (2D) or three dimensional (3D) gestures performed in 2D or 3D space depending on the number of measurement antenna. It is contemplated that any gesture could be detected if an accurate input model 192 is provided for that gesture. Examples of motion gestures include, without limitation, a one or two finger swipe (e.g., in a particular direction-left, right, up, down, up-left, up-tight, down-left, down right), pinch open, pinch close (e.g., reverse pinch), wave (e.g., in a particular direction—clockwise or counter-clockwise), squeeze (e.g., clench fist), expand (e.g., reverse squeeze), and point. A range of gestures emulating a joystick could be used, for example, for handicap applications by providing a virtual (3D) joystick. When the detected interaction 194 matches one of the input models 192, a motion gesture is detected. For example, the comparator output can be compared to the input models 192 to identify a matching motion gesture (if any). Since each input model 192 has a time component, it is apparent that the absolute distance of the object from the electronic device 130 need not be known. The processor 102 may also perform an action associated with the detected motion gesture.

The action associated with a motion gesture is typically context-sensitive and depends upon which of the applications 180 is the active application at the time the detected motion gesture was performed. For example, if the detected motion gesture represents a left to right swipe when the email application 184 is active, the action performed by the processor may be to display a next email message from the inbox of the email application whereas the action performed by the processor may be to display a previous email message from the inbox of the email application 184 if the detected motion gesture represents a right to left swipe when the email application 184 is active. However, the same motion gestures may cause the processor 102 to end a call (left to right swipe) or redial a phone number (right to left swipe) when the phone application 187 is the active application. Thus, the same gesture performed in a different context (i.e., a different active application, or a different selected, active or highlighted user interface element within the active application), may have a different result.

It will be appreciated that the input model 192 or other means of defining a gesture does not need to perfect. User feedback may be used to dynamically correct the action performed in response to the detected gesture. For example, if a user interface change is performed in response to a detected gesture performed by the user's hand, the user will be intuitively prompted to move his or her hand faster or slower, forward or backward, left or right, as the case may be when the user interface change does not match expectations. In this way, the user adapts his or her specific performance of the motion gesture to obtain the desired result.

Figure 3:
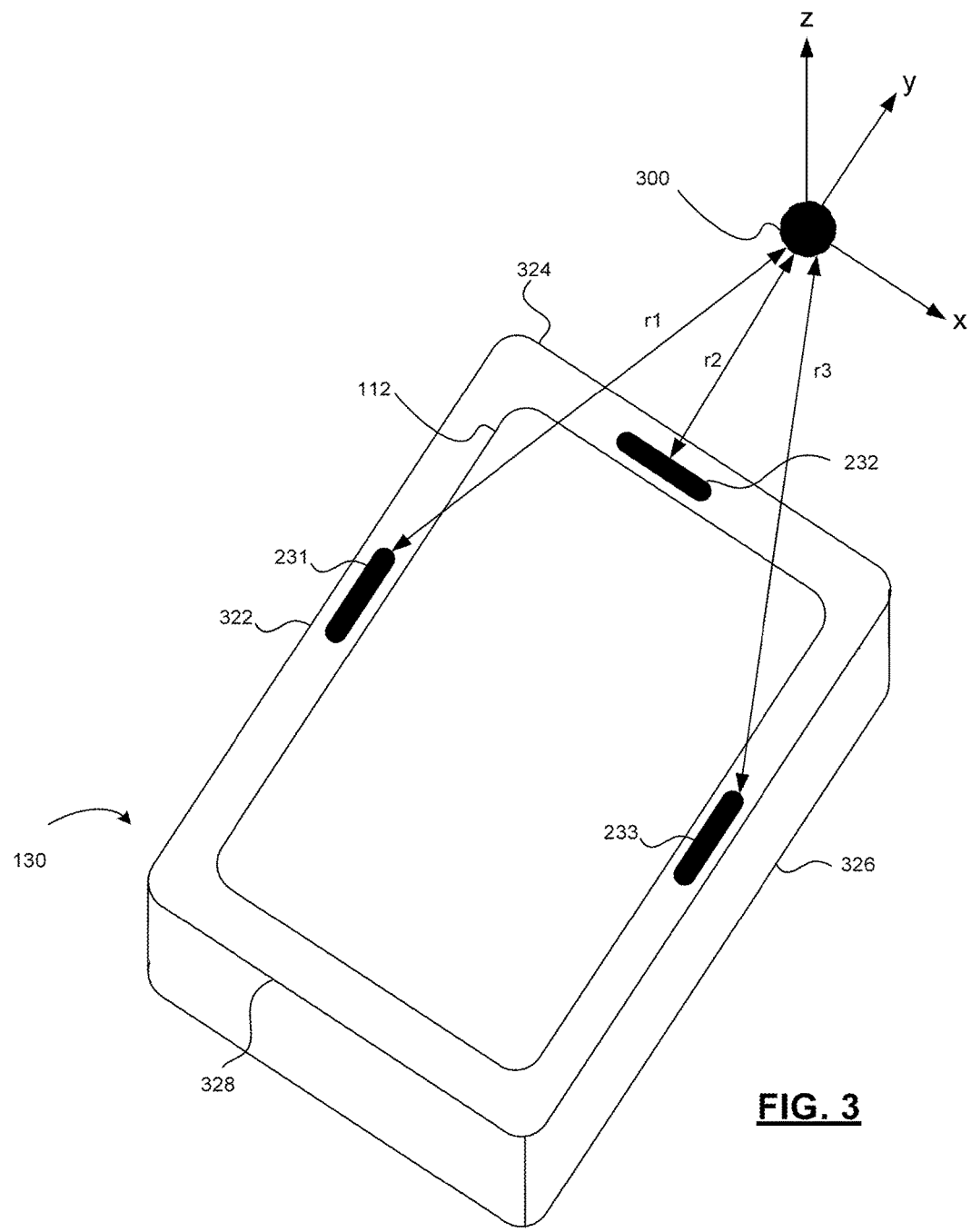
FIG. 3 illustrates in perspective view the example electronic device of FIG. 1 and an object for detection by the electronic device.

Reference is now made to FIG. 3, showing in perspective view an example electronic device 130 having measurement antennas 231, 232 and 233 mounted on a front face of the electronic device 130. In other examples, the antennas 231, 232 and 233 could be housed within the rigid case or internal housing of the electronic device 130 so that the antennas 231, 232 and 233 are hidden and protected. The antennas 231, 232 and 233 are located at first, second and third positions, respectively, so that the antennas 231, 232 and 233 are spaced apart from each other. When the antennas are spaced apart from each other, each antenna is detuned by a different amount as the antenna load of each antenna is varied by a different amount in dependence on the distance of the object from each antenna.

In the shown example, each of the antennas 231, 232 and 233 is positioned along a side of a rectangular display 112 in the front face of the electronic device 130. The rectangular display 112 may be square or rectangular. In the shown example, the first antenna 231 is positioned on a left side 322, the second antenna 232 is positioned on the top side 324 and a third antenna 233 is positioned at the right side 326. In other embodiments, the second antenna 232 can be positioned on the bottom side 328 rather than the top side 324. In yet other embodiments, a fourth antenna (not shown) coupled to a fourth measurement oscillator (not shown) may be added so that there is an antenna positioned along a back face or back cover (not shown). In yet other embodiments, an additional antenna (not shown) coupled to an additional measurement oscillator (not shown) may be added so that there is an antenna positioned along the left side 322, right side 326, top side 324 and bottom side 328 of the display 112.

In other embodiments, the measurement antennas are positioned along a side of a rectangular rigid case of the electronic device 130 rather than the display 112 of the electronic device 130. The rectangular case may be square or rectangular. The antennas 231, 232 and 233 may be positioned in or near the front face or the back face of the case. When position on the back face of the case, the user can turn the device over to interact with the electronic device 130 using motion gestures without worrying about interfering with the touch-sensitive display or other input devices on the front face of the electronic device 130.

In yet other embodiments, the electronic device 130 has a generally rectangular keyboard located on the front face of the electronic device 130, for example, below the display 112. The rectangular keyboard may be generally square shaped or rectangular. Each of the measurement antennas is positioned along a side of the rectangular keyboard similar to the arrangement about the rectangular display 112, described above and shown in FIG. 3.

In yet other embodiments, the electronic device 130 is a keyboard accessory and having a rectangular keyboard. Each of the measurement antennas is positioned along a side of the rectangular keyboard or a rigid case or housing of the electronic device 130.

In yet other embodiments, the electronic device 130 is a touchpad (or trackpad) accessory and having a rectangular touchpad (or trackpad). Each of the measurement antennas is positioned along a side of the rectangular touchpad (or trackpad) or a rigid case or housing of the electronic device 130.

The rectangular area bound by the measurement antennas 231, 232 and 233 is the most sensitive and therefore the preferred area for performing the motion gestures. It will be appreciated that the oscillators can be located anywhere within the electronic device 130.

Referring again to FIG. 3, an object 300 is shown within the sensitivity region of each of the antennas 231, 232 and 233. The distance from the object 300 and the first antenna 231 is shown as r1, the distance from the object 300 and the second antenna 232 is shown as r2 and the distance from the object 300 and the third antenna 233 is shown as r3. By applying trigonometric functions, such as triangulation functions, the processor 102 is able to estimate the position of the object 300 within the area of the display 112 from the first, second and third comparator output.

The number of measurement oscillators and antennas in the contact-free interaction subsystem 101 can vary between different embodiments. In some embodiments a single measurement oscillator and a single antenna are present. These embodiments allow for the detection of the object 300 and the relative position of the object 300 to the first antenna 231, i.e. a proximity measurement typically, R in polar coordinates. Thus, these embodiments allow the processor 102 to determine if the object 300 is getting closer or further away.

In other embodiments two measurement oscillators and two antennae are present. The two antennas, such as the first antenna 231 and third antenna 233 in FIG. 3, are located directly opposite to each other in a common plane of the electronic device 130. These embodiments allow for determining the position of the object 300 along a line between the first and second antennas 231 and 232.

In yet other embodiments, three measurement oscillators and third antennae are present, such as the first, second and third measurement oscillators 201, 202 and 203 and first, second and third antennas 231, 232 and 233. The first, second and third antennas 231, 232 and 233 are spaced apart from each other and located within a common plane with two of the first, second and third antennas 231, 232 and 233 being parallel to each other, and the other of the first, second and third antennas 231, 232 and 233 being perpendicular to the other two antennae. In some examples, the first, second and third antennas 231, 232 and 233 are each positioned along a different side of a rectangular area defined by the electronic device 130. The rectangular area may generally correspond to the display 112 or a keyboard (not shown). In other examples, the first, second and third antennas 231, 232 and 233 are each positioned along a different side of a rectangular area defined by the accessory device (not shown). The rectangular area may generally correspond to an input device or rigid case of the accessory device (not shown) connected to the electronic device 130. These embodiments allow for determining a relative three-dimensional position of the object 300 with respective to the plane of the first, second and third antennas 231, 232 and 233.

When the object is a user's hand, a relative location of an effective centroid of the user's hand in three-dimensional space can be determined. Because the three antennas are located within a common plane, it is not known if the relative location of the effective centroid is above or below the plane (i.e., along the z axis as shown in FIG. 3). In one example, the presence of the object 300 at a first location having parameters ($x_1$, $y_1$, $z_1$) thus has the same effect on the measurement antennas when the object is at a second location having parameters ($x_1$, $y_1$, $z_2$), where $z_1$ is above the plane of the electronic device 130 and $z_2$ is below the plane of the electronic device 130 (i.e., the object is at the same x, y position, but at the opposite side of the plane). When the object 300 is in the common plane of the three antennas, the value of the z coordinate is 0. The velocity and acceleration of the object, e.g. user's hand, can be used in addition to position to identify and detect motion gestures performed by the user.

In yet other embodiments, four or more measurement oscillators and four or more antennas are present in the contact-free interaction subsystem 101. The four or more antennas are positioned on two planes of the electronic device 130. At least three antennas are located within a common plane with two of the first, second and third antennas 231, 232 and 233 being parallel to each other, and the other of the first, second and third antennas 231, 232 and 233 being perpendicular to the other two antennae. At least one other antenna is located in a different plane. For example, three antennas may be placed adjacent to the display 112 on or near a front face of the electronic device 130 and the fourth antenna may be placed on a back face or back cover (not shown) of the electronic device 130. The measurement signal from the fourth antenna is useful in determining the position of the object along the z-axis of the electronic device 130, thereby allowing for determining an absolute three-dimensional position of the object 300 relative to the plane of the first, second and third antennas 231, 232 and 233. Since the antennas are arranged on two planes of the electronic device 130, the contact-free interaction subsystem 101 is able to differentiate between the object 300 at the first location having parameters ($x_1$, $y_1$, $z_1$) and the object 300 at the second location having parameters ($x_1$, $y_1$, $z_2$). When the object is a user's hand, an absolute location of an effective centroid of the user's hand in three-dimensional space can be determined.

Figure 4A:
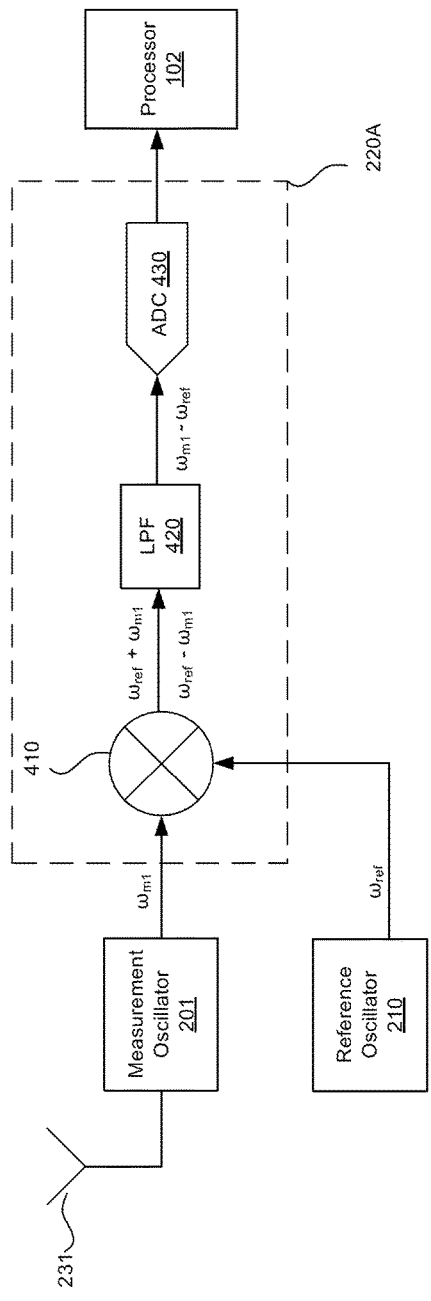
FIGS. 4A, 4B, 4C, 4D and 4E illustrate in block-diagram form example circuits which implement the contact-free interaction subsystem of the electronic device of FIG. 1.

Reference is now made to FIGS. 4A, 4B, 4C, 4D and 4E which show in block-diagram form example circuits implementing the features of the contact-free interaction subsystem 101. Reference is first made to FIG. 4A, showing in block-diagram form an embodiment of a comparator circuit 220A for use with the contact-free interaction subsystem 101. The comparator 220A includes a frequency mixer 410, a low pass filter (LPF) 420 and an analogue-to-digital convertor (ADC) 430. The frequency mixer 410 receives the first measurement signal having the first measurement frequency ($\omega_{m1}$) and the reference signal having the reference frequency ($\omega_{ref}$). As is known in the art, the frequency mixer 410 outputs two mixer output signals, an additive, first mixer output signal having a frequency of: $\omega_{ref}+\omega_{m1}$ and a differential, second mixer output signal having a frequency of: $\omega_{ref}-\omega_{m1}$. As previously explained, the difference between the reference frequency ($\omega_{ref}$) and the first measurement frequency ($\omega_{m1}$) represents the distance of the object 300 from the first antenna 231. Thus, the second mixer output signal is of interest for further processing. Because the second mixer output signal has a lower frequency than the first mixer output signal, the LPF 420 is used to filter out the first mixer output signal. The LPF 420 thus isolates and outputs the second mixer output signal to the ADC 430 for quantization into a discrete-amplitude digital signal. The DSP input signal is defined by Equation 1:

$$A\sin(\omega_{m1}t) + A\sin(\omega_{REF}t) =$$
$$2A\sin((\omega_{m1} + \omega_{REF})t/2)\cos((\omega_{m1} - \omega_{REF})t/2) =$$
$$2A\cos(\Delta\omega t/2)\sin(\omega t), \text{ where } \Delta\omega =$$
$$(\omega_{m1} - \omega_{REF})/2 \text{ and } \omega_{m1} \approx \omega_{REF} \approx \omega = 2A\cos(\Delta\omega t/2),$$
after low pass filtering (Equation 1)

The discrete-amplitude digital signal produced by the ADC 430 is then received by the processor 102 for further processing. At the processor 102, a fast Fourier transform (FFT) algorithm is executed to yield an array of frequency components and their associated amplitudes, which may further be reduced by determining the prevalent frequency component of the signal, i.e. the frequency component having the highest amplitude. This component is representative of the frequency of the second mixer output signal, i.e. the difference frequency ($\omega_{ref}-\omega_{m1}$). In some embodiments, the digital signal is received by a dedicated digital signal processor (DSP) before being received by the processor 102. The difference frequency is then stored in RAM 108 (FIG. 1), for example, by adding the difference frequency to the array of detected interactions 194.

The comparator 220A may be reproduced for each measurement oscillator with each comparator taking an input from the reference oscillator 210 and a measurement oscillator. Each comparator will output the difference frequency for the particular measurement oscillator coupled to the comparator 220A. The outputs of the comparators 220A may be time-synchronized with each other and combined in the array of detected interactions 194 for further processing by the processor 102.

Figure 4B:
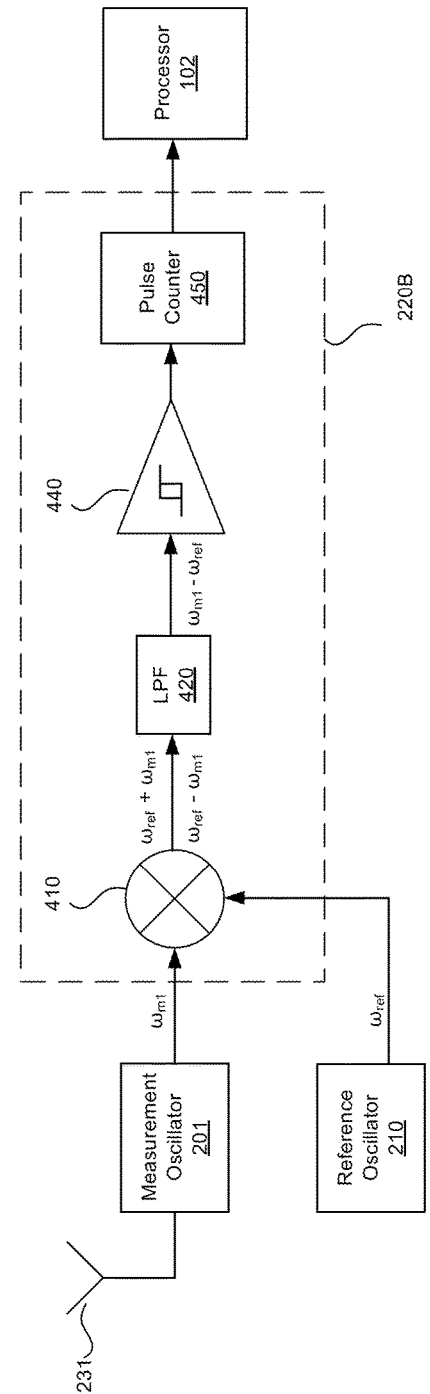

Reference is next made to FIG. 4B, showing in block-diagram form an embodiment of a comparator circuit 220B for use with the contact-free interaction subsystem 101. The comparator 220B includes the frequency mixer 410 and the low pass filter (LPF) 420 of the comparator 220A. However, the ADC 430 is replaced with a Schmitt-trigger 440 and a pulse counter 450. The operation of the mixer 410 and the LPF 420 in the comparator 220B is the same as in the comparator 220A. The second mixer output is generated and isolated by the mixer 410 and the LPF 420 respectively as in the comparator 220A. The Schmitt-trigger 440 then receives the second mixer output signal, having the difference frequency ($\omega_{ref}-\omega_{m1}$), and converts the signal to a square-wave signal to enable the comparator 220B to determine the difference frequency. The square-wave signal is characterized in that it alternates from a first high voltage to a second low voltage at a frequency corresponding to the difference frequency $\omega_{ref}-\omega_{m1}$. A pulse counter 450 then receives the square-wave signal, counts the number of pulses occurring during a predetermined time interval and outputs the count to the processor 102 for further processing. The number of pulses is representative of the difference frequency ($\omega_{ref}-\omega_{m1}$) and is thus also representative of the distance of the object 300 from the first antenna 231. That is, the count decreases with the distance of the object from the first antenna 231 and increases as the object gets closer to the first antenna. Depending on the object, the count may change proportionally to the distance of the object from the first antenna 231. The count is then added to the array of detected interactions 194 in RAM 108 (FIG. 1).

In some embodiments, a reference signal pulse counter (not shown) is added to count the number of pulses of the reference signal. Since the frequency of the reference signal does not vary, the number of pulses is indicative of a time interval. Accordingly, the predetermined time interval can be set by selecting a number of pulses of the reference signal. When the reference signal pulse counter reaches the selected number, the predetermined time interval expires.

The predetermined time interval used by the pulse counter 450 allows for tuning of the responsiveness of the contact-free interaction subsystem 101. A smaller time interval allows for a more responsive system as interactions are detected more immediately than when a larger time interval is used. A larger time interval offers a higher resolution system as more data is processed before a decision is made regarding the data, but may result in too much latency in response and thereby hinder human-computer interaction. In some embodiments, the time interval used by the pulse counter 450 for counting the number of pulses is within the range of one to four milliseconds, and in some embodiments, one millisecond. In one embodiment, the time interval is user-configurable via a graphical user interface. In one embodiment, the processor 102 controls the time interval based on the active application and the input model(s) 192 associated with the active application. The time interval may be defined in the input model(s) 192 which the processor 102 then uses to control the pulse counter 450.

The comparator 220B may be reproduced for each measurement oscillator. The outputs of the comparators 220B may be time-synchronized with each other and combined in the array of detected interactions 194 for further processing by the processor 102.

Figure 4C:
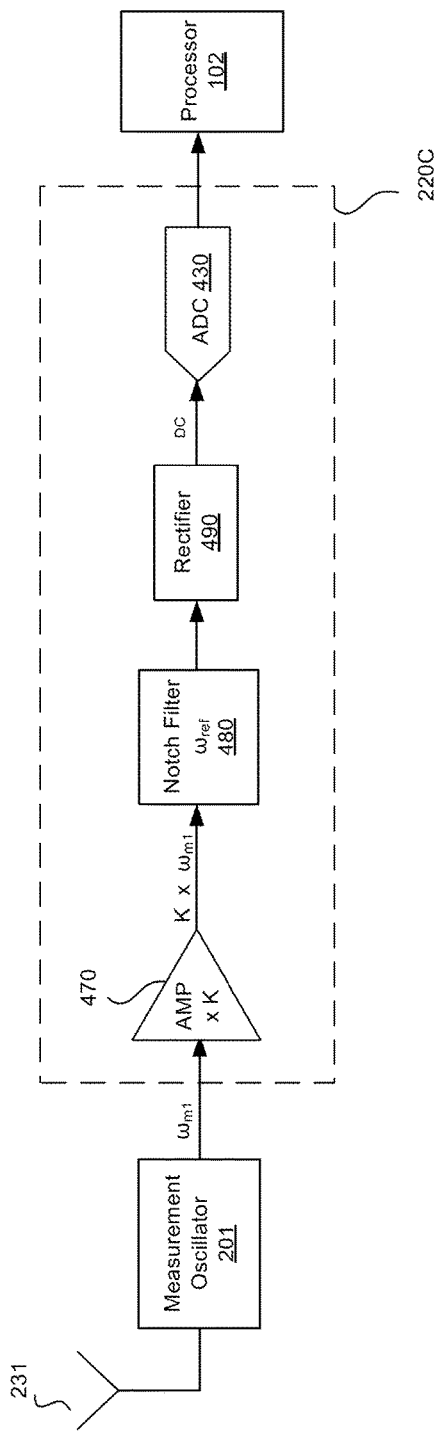

Reference is next made to FIG. 4C, showing in block-diagram form an embodiment of a comparator circuit 220C for use with the contact-free interaction subsystem 101. The comparator 220C does not require a reference oscillator or a frequency mixer. The measurement oscillator 201 generates a measurement signal having the reference frequency ($\omega_{ref}$) and is coupled to the first antenna 231. The presence of an object 300 causes the measurement signal frequency to deviate from the reference frequency to the first measurement frequency ($\omega_{m1}$) which represents the distance of the object 300 from the first antenna 231.

The measurement signal is optionally amplified by amplifier 470, for example, a cascade amplifier, having a gain factor of "K". The amplified signal is then received at a notch filter 480. The notch filter is tuned to block or attenuate any signal having a frequency equal to the reference frequency ($\omega_{ref}$). Accordingly, when no object 300 is present within the sensitivity region of the first antenna 231, the output of the notch filer 480 is highly attenuated, as the measurement signal also has a frequency equal to the reference frequency ($\omega_{ref}$). However, when an object 300 is within the sensitivity region of the first antenna 231, the detuning of the first antenna 231 causes the frequency of the measurement signal to deviate from the reference frequency, i.e. the measurement signal has a first measurement frequency ($\omega_{m1}$). The measurement signal having the first measurement frequency is therefore not attenuated by the notch filter 480.

The filtered measurement signal is then received by the rectifier 490. The rectifier 490 converts the measurement signal from a sinusoidal signal to a direct current (DC) signal. The amplitude DC signal varies in accordance with the antenna load of the first antenna 231, i.e. the detuning of the first antenna 231. The greater the detuning, the higher the amplitude of the DC signal is because less of the measurement signal is attenuated by the notch filter 480. Accordingly, the DC output increases when an object 300 is moved closer to the first antenna 231 and decreases when the object 300 is moved away from the first antenna 231. The amplitude of the DC signal is then received by the ADC 430 for quantization. A digital value may be signed to the amplitude of the DC signal, which is then received by the processor 102 for further processing.

The comparator 220C may also be reproduced for each measurement oscillator. The outputs of the comparators 220C may be time-synchronized with each other and combined in the array of detected interactions 194 for further processing by the processor 102.

Figure 4D:
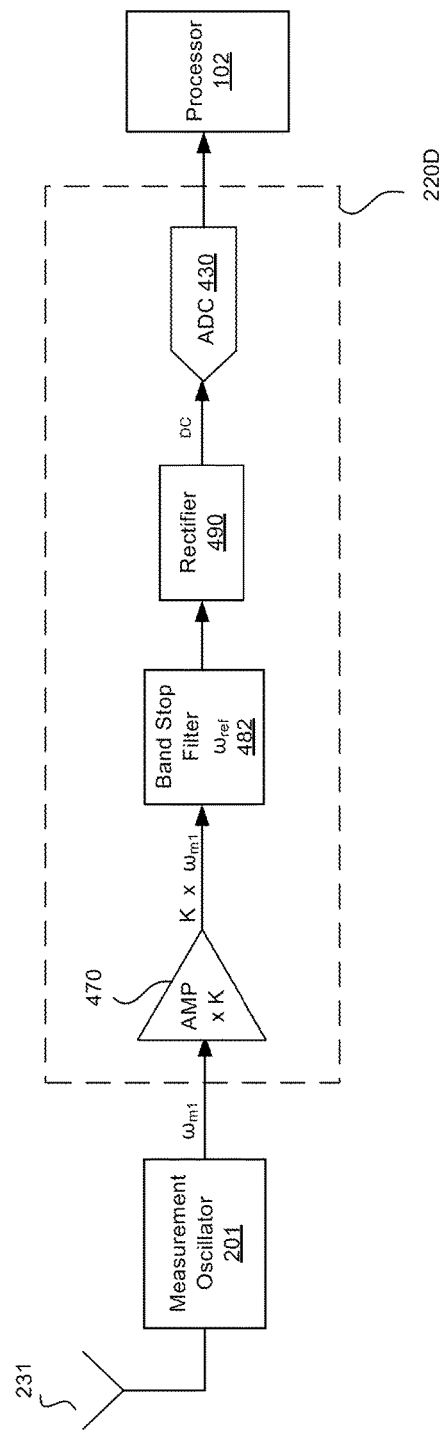

Reference is next made to FIG. 4D, showing in block-diagram form an embodiment of a comparator circuit 220D for use with the contact-free interaction subsystem 101. The comparator 220D is similar to the comparator 220C with the notch filter 480 of the comparator 220C replaced with a band stop filter 482 in the comparator 220D.

The measurement signal is optionally amplified by amplifier 470, for example, a cascade amplifier, having a gain factor of "K". The amplified signal is then received at the band stop filter 482. The band stop filter 482 is tuned to only allow signals having a frequency equal to the reference frequency ($\omega_{ref}$). Other frequencies are stopped or attenuated. Thus, when no object 300 is present within the sensitivity region of the first antenna 231, the output of the band stop filter 482 is not attenuated because the measurement signal also has a frequency equal to the reference frequency ($\omega_{ref}$). However, when the object 300 is within the sensitivity region of the first antenna 231, the detuning of the first antenna 231 causes the frequency of the measurement signal to deviate from the reference frequency, i.e. the measurement signal has a first measurement frequency ($\omega_{m1}$). The measurement signal having the first measurement frequency is therefore attenuated by the band stop filter 482.

The filtered measurement signal is then received by the rectifier 490. The rectifier 490 converts the measurement signal from a sinusoidal signal to a direct current (DC) signal. The amplitude DC signal varies in accordance with the antenna load of the first antenna 231, i.e. the detuning of the first antenna 231. The greater the detuning, the lower the amplitude of the DC signal is because more of the measurement signal is attenuated by the band stop filter 482. Accordingly, the DC output decreases when an object 300 is moved closer to the first antenna 231 and increases when the object 300 is moved away from the first antenna 231. The amplitude of the DC signal is then received by the ADC 430 for quantization. A digital value may be signed to the amplitude of the DC signal, which is then received by the processor 102 for further processing.

The comparator 220D may be reproduced for each measurement oscillator. The outputs of the comparators 220D may be time-synchronized with each other and combined in the array of detected interactions 194 for further processing by the processor 102.

Figure 4E:
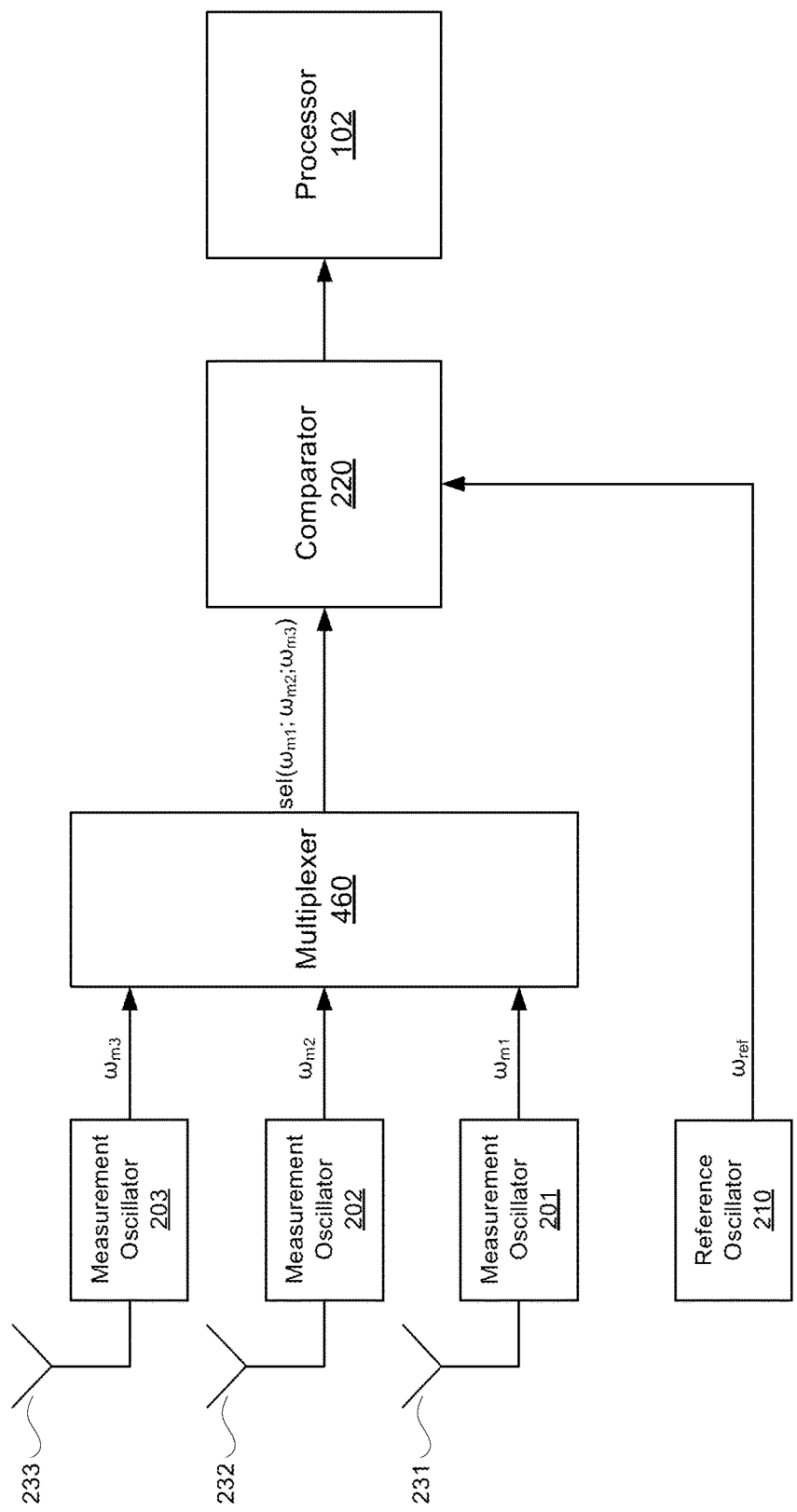

Reference is next made to FIG. 4E, showing in block-diagram form an embodiment of the contact-free interaction subsystem 101. As previously explained, the comparator 220 (such as comparator 220A, 220B, 220C or 220D) may be reproduced for each measurement oscillator. However, this introduces an apparent inefficiency in that the same component is reproduced multiple times depending on the number of measurement oscillators used. In FIG. 4E, one comparator 220, such as the comparator 220A from Figure A, is used for three measurement oscillators. In some embodiments, one comparator 220 is used for four or more measurement oscillators.

The output of each measurement oscillator is fed into a multiplexer 460. The multiplexer 460 is controlled by a clock (not shown), such as a system clock, to alternate the input to the comparator 220 between the outputs of the three (or more) measurement oscillators. The output of each measurement oscillator is selected, for processing by the comparator 220 and the processor 102, for a short period of time. However, since each output of the measurement oscillators represents the position of the object 300 at a particular point in time, the outputs are preferably time-synchronized with each other to enable the processor 102 to determine the location of the object 300. Because the multiplexer 460 switches between the outputs at a high rate, for example every one millisecond (ms), it is unlikely that the object 300 has moved a large distance over each cycle; given the relative short duration of each cycle (e.g., one millisecond). Additionally, the processor 102 receives the comparator output over a longer period of time, for example nine milliseconds. Thus, the processor 102 receives the comparator output associated with the first measurement signal at time equal to 1, 4 and 7 ms, receives the second measurement signal at time equal to 2, 5 and 8 ms, and receives the third measurement signal at time equal to 3, 6 and 9 ms. The processor 102 can interpolate the comparator output for each of the oscillators for the times when no output is provided. For example, the processor 102 can interpolate the comparator output associated with the first measurement signal at times 2, 3, 5 and 6 ms.

It will be appreciated that, in some example embodiments, the comparator 220 (such as comparator 220A, 220B, 220C or 220D) described above may be implemented as a complex programmable logic device (CPLD) or an integrated circuit (IC), among other possibilities.

Figure 5:
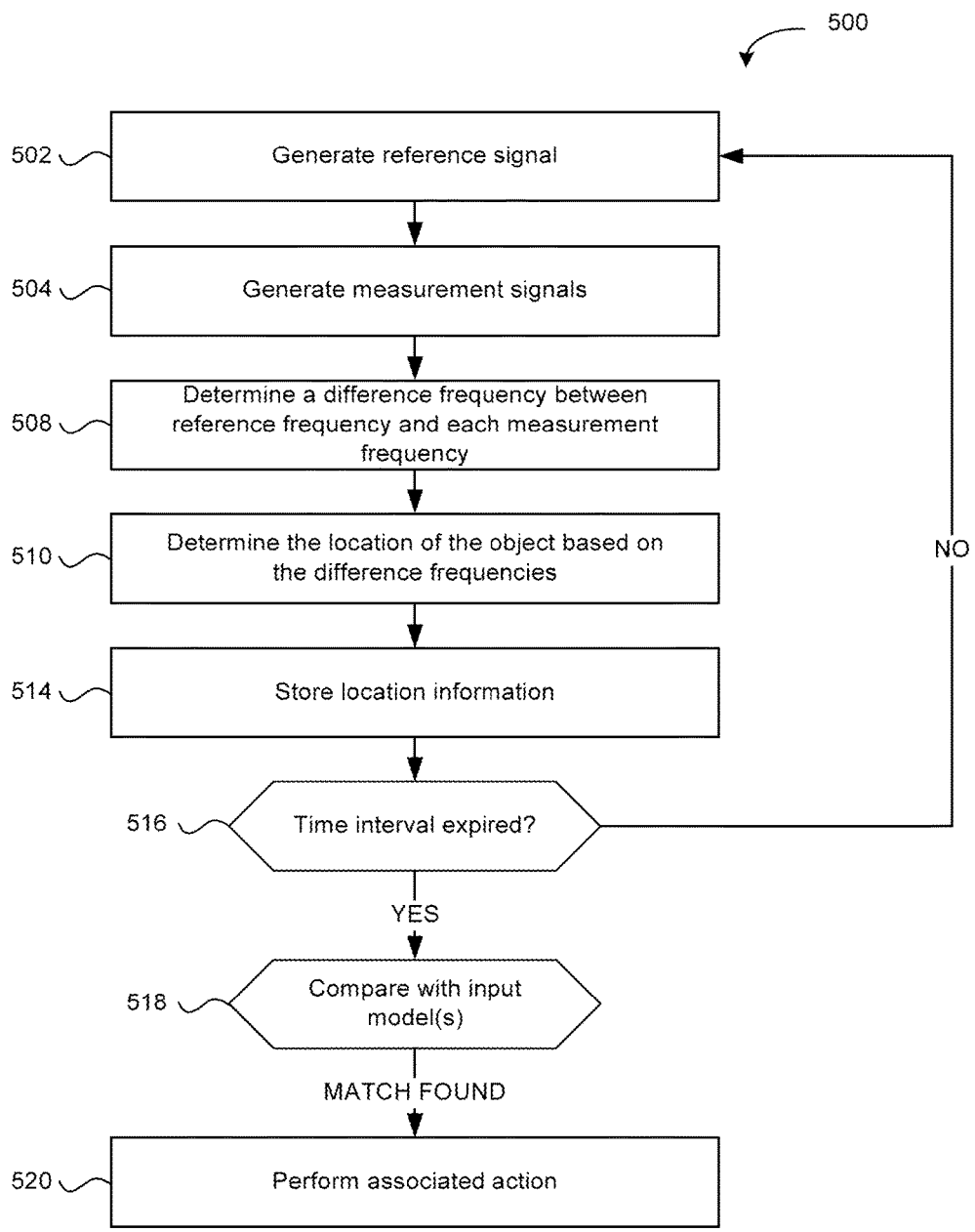
FIG. 5 illustrates a flowchart of an example method for detecting an object in accordance with an example embodiment of the teachings of the present disclosure.

Reference is now made to FIG. 5 which shows a flowchart of a method 500 for detecting an object 300. The method may be implemented by any electronic device having a contact-free interaction subsystem 101 in accordance with the disclosure. The method 500 may be carried out by software executed, for example, by a processor. Coding of software for carrying out such a method 500 is within the scope of a person of ordinary skill in the art provided the present disclosure. The method 500 may contain additional or fewer processes than shown and/or described, and may be performed in a different order. Computer-readable code executable by the processor 102 to perform the method 500 may be stored in a computer-readable medium such as a memory of a host device.

The processor 102, at 502, instructs the reference oscillator 210 to generate the reference signal, having the reference frequency ($\omega_{ref}$). In one embodiment, the processor 102 only enables the reference oscillator 210 if the active application has an associated input model 192 stored in persistent memory 120. When the active application does not an associated input model 192 stored in persistent memory 120, the processor 102 may disable the reference oscillator 210 to reduce the power consumption of the electronic device 130.

When the reference oscillator is enabled, the processor 102 also enables the measurement oscillators, at 504, to each generate a measurement signal. In some embodiments, the first, second and third measurement oscillators 201, 202 and 203 are enabled, to generate first, second and third measurement signals. However, the number of measurement oscillators enabled may vary between different embodiments either in accordance with the number of measurement oscillators included in the contact-free interaction subsystem 101 or on the active application.

The object 300 causes an antenna load of each of first, second and third antennas 231, 232 and 233 to vary in dependence with permittivity of the object 300 and the distance of the object 300 from each of the antennas. The first antenna 231 is coupled to the first measurement oscillator 201; thus, the object 300 causes the frequency of the first measurement signal to vary in correspondence with the distance of the object 300 from the first antenna 231 and the permittivity of the object 300. The second antenna 232 is coupled to the second measurement oscillator 202; thus, the object 300 causes the frequency of the second measurement signal to vary in correspondence with the distance of the object 300 from the second antenna 232 and the permittivity of the object 300. The third antenna 233 is coupled to the third measurement oscillator 203; thus, the object 300 causes the frequency of the third measurement signal to vary in correspondence with the distance of the object 300 from the third antenna 233 and the permittivity of the object 300. Each of the measurement signals is then processed by the comparator 202, at 508, to determine difference frequencies, each difference frequency being equal to the difference between the reference frequency and a respective measurement frequency. Each difference frequency is representative of the distance of the object 300 from the measurement antenna coupled to the measurement oscillator producing the signal having the difference frequency.

The processor 102 then at 510 determines a two-dimensional location of the object 300 based on at least three difference frequencies. In embodiments in which three measurement antennas are each positioned along a side of the display 112, the two-dimensional location of the object 300 is a set of coordinates within the area of the display 112, which may be defined using Cartesian as x and y coordinates. The set of x and y coordinates are correlated with the time that the object 300 is detected (i.e., when the antenna load is varied by at least a threshold amount). The processor 102 then at 514 stores the location information in memory, for example in RAM 108 as an element is the array of detected interactions 194.

The operations 502 to 514 are repeated until expiry of a time interval for detecting the object 300. The time interval is an interval during which data is buffered in the RAM 108 prior to processing by the processor 102. After the expiry of the time interval, it is expected that the processor 102 has sufficient data to determine if the detected interactions 194 match any of the stored input models 192, as will be explained. The time interval is contemplated to be within the range of several milliseconds depending on the implementation. Once sufficient data is present in the RAM 108 to perform operation 518, the operation of the method 500 continues. The time interval may vary between embodiments based on the input model 192 or the data collected. If the data collected indicates that the object 300 is stationary, then the time interval may be extended. If the data collected indicates the object 300 is fast moving, the time interval may be shortened. In some embodiments, the time interval may be defined by an input model 192 associated with the active application. In other embodiments, the same time interval applies for all input models 192.

Once the time interval is determined, by the processor 102, to have expired at 516, the method 500 continues to 518. The processor 102, using contact-free interaction recognition application 181, compares the detected interaction 194 with the input models 192 to determine if the detected interactions 194 match any of the stored input models 192. As noted above, each input model represents a distinct, predefined motion gesture which represents movement of an object over time. Examples of motion gestures include, without limitation, a one or two finger swipe (e.g., in a particular direction left, right, up, down, up-left, up-tight, down-left, down right), pinch open, pinch close (e.g., reverse pinch), wave (e.g., in a particular direction—clockwise or counterclockwise), squeeze (e.g., clench fist), expand (e.g., reverse squeeze), and point. The input models may be specific to the active application or may be operating system level models that apply to any detected interaction 194 irrespective of the active application.

If the processor 102 determines, using contact-free interaction recognition application 181, that the detected interaction 194 matches an input model 192, a motion gesture is detected and the processor 102 may perform an action associated with the detected motion gesture at operation 520. In some embodiments, the action is based on context, i.e. the active application and/or a state of the active application when the motion gesture is detected. In some embodiments, the operating system 178 of the electronic device 130 allows for multi-tasking, thus the contact-free interaction recognition application 181 runs in the background while another application is run is the active application being run in the foreground. In other embodiments, the functions of the contact-free interaction recognition application 181 may be part of the active application.

In one example, the active application is the contacts application 182 while the contact-free interaction recognition application 181 runs in the background. Prior to detecting the motion gesture, the processor 102 receives a selection input indicating selection of a contact entry in an address book of the contact application 182 in which the contact entry includes a phone number. The processor 102 may determine that the action associated with the detected motion gesture, given the context in which the gesture occurred (i.e., the selection of the contact entry having a phone number), is to initiate a call to the phone number in the contact entry using the phone application 187. Alternatively, if the contact entry included a VoIP address, the processor 102 may determine that the action associated with the detected motion gesture, given the context in which the motion gesture occurred (i.e., the selection of the contact entry having a VoIP address), is to initiate a VoIP call or video call to the VoIP address in the contact entry using the VoIP application 186.

In another example, the active application may be the call log application 183. Prior to detecting the motion gesture, the processor 102 receives a selection indicating selection of an entry in the call log application 183, the entry having a phone number. The processor 102 may determine that the action associated with the detected motion gesture, given the context in which the motion gesture occurred (i.e., the selection of the entry) is to initiate a call to the phone number.

In yet another example, the active application may be the email application 184. Prior to detecting the motion gesture, the processor 102 receives a selection of a received email in the email application, the received email having an email address associated with it. The processor 102 may determine that the action associated with the detected motion gesture, given the context in which the motion gesture occurred (i.e., the selection of the email message), is to send an automated reply message to the sender of the received email. This may be beneficial when a user is driving, for example, and the automated reply message is configured to indicate this. If the processor 102 detects that a phone number is included in the body of the email message, or that the sender of the email message is associated with a contact entry in the contacts application 182 in which the contact entry includes a phone number, the processor 102 may determine that the action associated with the detected motion gesture, given the context in which the motion gesture occurred (i.e., the selection of the email message having a phone number associated therewith), is to initiate a call to the phone number.

In yet another example, the active application may be the SMS application 185. Selection of a received SMS message may trigger actions similar to selection of a received email message as described above. A phone call may be placed to the sender of the message, or an automated reply message may be sent to the sender of the message as described above in the context of a received email message.

The contact-free interaction subsystem 101 of the present disclosure seeks to provide an alternate solution for gesture detection. It is believed that the contact-free interaction subsystem 101 may reduce the cost and space requirements for gesture detection compared with other solutions. As described above, the contact-free interaction subsystem 101 uses an antenna controlled RF oscillator susceptible to detuning by virtue of the proximity of a user's hand or stylus, thereby resulting effective reactance (i.e., capacitance and/or inductance) loading variation. This oscillator output is compared to the output of a reference oscillator to determine a change in the frequency of the oscillator output. This change can then be compared to a LUT table to determine a distance of the user's hand to the antenna. When three or antennas are used, a location of the object in 2D space can be determined. The changes in location over time can then be used to detect gestures using one or more input models. The contact-free interaction subsystem 101 does not require production calibration or tuning, nor does it require user training or calibration. Additionally, the contact-free interaction subsystem 101 may be duty cycled to save power when the electronic device 130 is in a low power mode.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the described embodiments set forth in the examples, but should be given the broadest interpretation consistent with the description as a whole.

The invention claimed is:

1. An electronic device configured to detect contact-free interaction, comprising:
    a comparator;
    a reference oscillator directly connected to the comparator and configured to generate a reference data signal having a reference frequency and output the reference data signal directly to the comparator;
    a first antenna located at a first position of the electronic device, wherein the first antenna has a first antenna load having a reactance value based on inductive and capacitive elements of the first antenna, wherein the first antenna load varies in accordance with a location of an object within a sensitive region of the first antenna and a permittivity of the object;
    a first measurement oscillator directly connected to the comparator and the first antenna, wherein the first measurement oscillator is configured to generate a first measurement data signal having a first measurement frequency corresponding to the first antenna load and output the first measurement data signal directly to the comparator, wherein the first antenna is tuned so that the first measurement frequency is substantially the same as the reference frequency when no object is within the sensitivity region of the first antenna and so that the first measurement frequency varies from the reference frequency by an amount that depends on the first antenna load; and
    wherein the comparator receives the reference data signal directly from the reference oscillator and receives the first measurement data signal directly from the first measurement oscillator, wherein the comparator determines a difference between the reference frequency and the first measurement frequency, and outputs a first output data signal representing the determined difference which represents a distance of the object from the first antenna.

2. The electronic device of claim 1, wherein the reference frequency is a frequency within one of the industrial, scientific or medical (ISM) radio bands.

3. The electronic device of claim 1, wherein the comparator comprises a frequency mixer which receives the reference data signal and the first measurement data signal and outputs a difference signal having a difference frequency, wherein the difference frequency is equal to the difference between the reference frequency and the first measurement frequency.

4. The electronic device of claim 3, wherein the comparator converts the difference signal to a square-wave signal to determine the difference frequency.

5. The electronic device of claim 4, wherein the comparator comprises:
    a Schmitt-trigger circuit for converting the difference signal to the square-wave signal; and
    a pulse counter for counting pulses of the square-wave signal during a predetermined time interval.

6. The electronic device of claim 1, further comprising:
    a second antenna located at a second position of the electronic device, wherein the second antenna has a second antenna load having a reactance value based on inductive and capacitive elements of the second antenna, wherein the second antenna load varies in accordance with a location of an object within a sensitive region of the second antenna and a permittivity of the object;
    a second measurement oscillator directly connected to the comparator and the second antenna, wherein the second measurement oscillator is configured to generate a second measurement data signal having a second measurement frequency corresponding to the second antenna load and output the second measurement data signal directly to the comparator, wherein the second antenna is tuned so that the second measurement frequency is substantially the same as the reference frequency when no object is within the sensitivity region of the second antenna, and so that the second measurement frequency varies from the reference frequency by an amount that depends on the second antenna load;
    a third antenna located at a third position of the electronic device, wherein the third antenna has a third antenna load having a reactance value based on inductive and capacitive elements of the third antenna, wherein the third antenna load varies in accordance with a location of an object within a sensitive region of the third antenna and a permittivity of the object;
    a third measurement oscillator directly connected to the comparator and the third antenna, wherein the third measurement oscillator is configured to generate a third measurement data signal having a third measurement frequency corresponding to the third antenna load and output the third measurement data signal directly to the comparator, wherein the third antenna is tuned so that the third measurement frequency is substantially the same as the reference frequency when no object is within the sensitivity region of the third antenna, and so that the third measurement frequency varies from the reference frequency by an amount that depends on the third antenna load;
    wherein the first, second and third antennas are positioned within a common plane and spaced apart from each other;
    wherein the comparator receives the second measurement data signal and third measurement data signal directly from the second and third measurement oscillators, wherein the comparator determines a difference between the reference frequency and the second measurement frequency and outputs a second output signal representing the determined difference which represents a distance of the object from the second antenna, and wherein the comparator determines a difference between the reference frequency and the third measurement frequency and outputs a third output signal representing the determined difference which represents a distance of the object from the third antenna.

7. The electronic device of claim 6, wherein two of the first, second and third antennae are parallel to each other and the other of the first, second and third antenna is perpendicular to the other two antennae.

8. The electronic device of claim 6, further comprising a processor configured to determine from the first, second and third comparator outputs a relative location of the object based on the distance of the object to each of the first, second and third antenna.

9. The electronic device of claim 8, wherein the processor is further configured to:
    determine whether the location of the object moves over time;

when the location of the object moves over time, determine whether movement of the object matches an input model for a motion gesture to detect the motion gesture; and perform an action associated with the detected motion gesture.

10. The electronic device of claim 9, wherein the action is dependent on a context in which the detected motion gesture was performed.

11. The electronic device of claim 8, wherein the electronic device is configured to detect a particular object or particular type of object is within the sensitivity region of the first antenna, wherein the processor is configured to determine the relative location of the object based on the distance of the object to each of the first, second and third antenna and the permittivity of the particular object or particular type of object.

12. The electronic device of claim 6, further comprising a rectangular display, wherein each of the first, second and third antennas is positioned along a side thereof.

13. The electronic device of claim 6, further comprising a rectangular keyboard, wherein each of the first, second and third antennas is positioned along a side thereof.

14. The electronic device of claim 6, further comprising a rectangular accessory device connected to the electronic device via a wired or wireless connection, wherein each of the first, second and third antennas is positioned along a side thereof.

15. The electronic device of claim 6, further comprising:
a fourth antenna located at a fourth position of the electronic device, wherein the fourth antenna has a fourth antenna having a reactance value based on inductive and capacitive elements of the first antenna, wherein the first antenna load varies in accordance with a location of an object within a sensitive region of the fourth antenna and a permittivity of the object;
a fourth measurement oscillator directly connected to the comparator and the fourth antenna, wherein the fourth measurement oscillator is configured to generate a fourth measurement data signal having a fourth measurement frequency corresponding to the fourth antenna load and output the fourth measurement data signal directly to the comparator, wherein the fourth antenna is tuned so that the fourth measurement frequency is substantially the same as the reference frequency when no object is within the sensitivity region of the fourth antenna, and so that the fourth measurement frequency varies from the reference frequency by an amount that depends on the fourth antenna load;
wherein the fourth antenna is positioned in a different plane than the first, second and third antennas;
wherein the comparator receives the fourth measurement data signal directly from the fourth measurement oscillator, wherein the comparator determines a difference between the reference frequency and the fourth measurement frequency and outputs a fourth output signal representing the determined difference which represents a distance of the object from the fourth antenna.

16. The electronic device of claim 15, further comprising a processor configured to determine from the first, second, third and fourth comparator outputs an absolute location of the object based on the distance of the object to each of the first, second, third and fourth antenna.

17. The electronic device of claim 16, wherein the electronic device is configured to detect a particular object or particular type of object is within the sensitivity region of the first antenna, wherein the processor is configured to determine the absolute location of the object based on the distance of the object to each of the first, second, third and fourth antenna and the permittivity of the particular object or particular type of object.

18. The electronic device of claim 1, wherein the electronic device is configured to detect a particular object or particular type of object is within the sensitivity region of the first antenna.

19. The electronic device of claim 18, wherein the particular object or particular type of object comprises a hand or a stylus.

20. The electronic device of claim 1, wherein the reference oscillator is not connected to an antenna and the reference data signal is not transmitted via an antenna.

21. An electronic device, comprising:
a filter;
a reference oscillator directly connected to the filter and configured to generate a reference data signal having the reference frequency and output the reference data signal directly to the filter;
a first antenna located at a first position of the electronic device, wherein the first antenna has a first antenna load having a reactance value based on inductive and capacitive elements of the first antenna, wherein the first antenna load varies in accordance with a location of an object within a sensitive region of the first antenna and a permittivity of the object within the sensitive region;
a first measurement oscillator directly connected to the filter and the first antenna to generate a first measurement data signal having a first measurement frequency corresponding to the first antenna load and output the first measurement data signal directly to the filter, wherein the first antenna is tuned so that the first measurement frequency is substantially the same as a reference frequency when no object is within the sensitivity region of the first antenna and so that the first measurement frequency varies from the reference frequency by an amount that depends on the first antenna load; and
wherein the filter receives the reference data signal directly from the reference oscillator and receives the first measurement data signal directly from the measurement oscillator, and outputs an output data signal representing a difference between the reference frequency and the first measurement frequency which represents a distance of the object from the first antenna.

22. The electronic device of claim 21, wherein the filter is any one of a notch filter tuned to block or attenuate a signal having a frequency equal to the reference frequency or a band stop filter tuned to allow a signal having a frequency equal to the reference frequency.

* * * * *